US010241529B2

(12) United States Patent
Frerking

(10) Patent No.: US 10,241,529 B2
(45) Date of Patent: Mar. 26, 2019

(54) ENVIRONMENT CONTROLLER, AN ENVIRONMENT CONTROL SYSTEM AND ENVIRONMENT CONTROL METHOD

(71) Applicant: Aristocrat Technologies Australia PTY Limited, North Ryde (AU)

(72) Inventor: Gary Frerking, Henderson, NV (US)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 222 days.

(21) Appl. No.: 14/833,934

(22) Filed: Aug. 24, 2015

(65) Prior Publication Data

US 2015/0362930 A1 Dec. 17, 2015

Related U.S. Application Data

(63) Continuation of application No. 13/421,542, filed on Mar. 15, 2012, now abandoned.
(Continued)

(51) Int. Cl.
G05D 23/19 (2006.01)
F24F 11/30 (2018.01)
(Continued)

(52) U.S. Cl.
CPC ..... *G05D 23/1934* (2013.01); *G05D 23/1917* (2013.01); *F24F 11/30* (2018.01);
(Continued)

(58) Field of Classification Search
CPC ............... G05B 19/02; G05D 23/1934; G05D 23/1917; F24F 11/001; F24F 11/0034;
(Continued)

(56) References Cited

U.S. PATENT DOCUMENTS 4,775,099 A * 10/1988 Podlipnik .......... G05D 23/2754
165/258
5,170,935 A * 12/1992 Federspiel ........... F24F 11/0009
236/44 C
(Continued)

FOREIGN PATENT DOCUMENTS

GB 2414419 11/2005
JP 2005266791 9/2005
(Continued)

OTHER PUBLICATIONS

United States Patent and Trademark Office, "Non-Final Office action", issued in connection with US. Appl. No. 13/421,542, dated Jul. 29, 2014, 33 pages.
(Continued)

Primary Examiner — M. N. Von Buhr
(74) Attorney, Agent, or Firm — Armstrong Teasdale LLP

(57) ABSTRACT

An example environment control system for a venue includes a controllable device arranged to perform at least one of heating, cooling or ventilation of the venue so as to affect the environment of the venue; a plurality of input devices disposed throughout the venue, each input device operable by a user to input environment feedback; and an environment controller arranged to control the at least one controllable device based on the environment feedback.

26 Claims, 6 Drawing Sheets

Related U.S. Application Data

(60) Provisional application No. 61/452,892, filed on Mar. 15, 2011.

(51) Int. Cl.
*F24F 110/00* (2018.01)
*F24F 120/10* (2018.01)
*F24F 120/20* (2018.01)
*F24F 11/52* (2018.01)

(52) U.S. Cl.
CPC ............ *F24F 11/52* (2018.01); *F24F 2110/00* (2018.01); *F24F 2120/10* (2018.01); *F24F 2120/20* (2018.01)

(58) Field of Classification Search
CPC ....... F24F 2011/0091; F24F 2011/0057; F24F 11/52; F24F 11/30; F24F 2110/00; F24F 2120/10; F24F 2120/20
USPC ........................................................ 700/276
See application file for complete search history.

(56) References Cited

U.S. PATENT DOCUMENTS

| | | | | |
|---|---|---|---|---|
| 5,275,333 | A * | 1/1994 | Tamblyn | F24F 3/00 137/554 |
| 5,725,148 | A * | 3/1998 | Hartman | F24F 3/044 165/217 |
| 5,839,654 | A * | 11/1998 | Weber | G05D 23/1905 236/47 |
| 6,145,751 | A * | 11/2000 | Ahmed | G05D 23/1919 165/208 |
| 6,366,832 | B2 * | 4/2002 | Lomonaco | F24F 11/0001 236/49.3 |
| 6,402,043 | B1 * | 6/2002 | Cockerill | G05D 23/1919 165/11.1 |
| 6,865,449 | B2 * | 3/2005 | Dudley | F24F 11/006 165/205 |
| 7,089,087 | B2 * | 8/2006 | Dudley | F24F 11/0086 236/1 B |
| 7,469,550 | B2 * | 12/2008 | Chapman, Jr. | F24F 11/0034 236/22 |
| 7,756,602 | B2 * | 7/2010 | Koempel | A63F 13/10 318/567 |
| 8,622,838 | B2 * | 1/2014 | Hedrick | A63F 13/00 463/29 |
| 8,731,723 | B2 * | 5/2014 | Boll | F24F 11/0086 700/17 |
| 9,058,714 | B2 * | 6/2015 | Hamlin | G07F 17/3202 |
| 2004/0004559 | A1 * | 1/2004 | Rast | 341/34 |
| 2004/0235570 | A1 | 11/2004 | Rothschild | |
| 2005/0181347 | A1 * | 8/2005 | Barnes | G09B 19/06 434/350 |
| 2005/0277381 | A1 * | 12/2005 | Banerjee | F24F 11/001 454/229 |
| 2006/0040793 | A1 * | 2/2006 | Martens | A63B 22/00 482/8 |
| 2006/0100784 | A1 | 5/2006 | Wang | |
| 2006/0164932 | A1 * | 7/2006 | Kavanagh | G11B 19/025 369/30.28 |
| 2007/0138307 | A1 * | 6/2007 | Khoo | F24F 11/006 236/1 C |
| 2008/0054561 | A1 * | 3/2008 | Canterbury | G07F 17/32 273/148 B |
| 2009/0197683 | A1 * | 8/2009 | Svennebring | G07F 17/32 463/42 |
| 2010/0046553 | A1 * | 2/2010 | Daigle et al. | 370/474 |
| 2010/0106365 | A1 * | 4/2010 | Visconti | B60H 1/00742 701/36 |
| 2010/0231421 | A1 * | 9/2010 | Rawls-Meehan | 341/20 |
| 2010/0261530 | A1 * | 10/2010 | Thomas et al. | 463/36 |
| 2010/0281436 | A1 * | 11/2010 | Kipman et al. | 715/863 |
| 2011/0098056 | A1 * | 4/2011 | Rhoads et al. | 455/456.1 |
| 2011/0118029 | A1 * | 5/2011 | Lukas | G06F 21/32 463/37 |
| 2011/0161076 | A1 * | 6/2011 | Davis et al. | 704/231 |
| 2011/0231320 | A1 * | 9/2011 | Irving | 705/80 |
| 2011/0311955 | A1 * | 12/2011 | Forsten | A63B 24/0075 434/247 |
| 2012/0085831 | A1 * | 4/2012 | Kopp | F24F 11/0009 236/46 A |
| 2012/0232715 | A1 * | 9/2012 | Vass | G01W 1/17 700/300 |
| 2012/0239203 | A1 * | 9/2012 | Amundson | G05B 19/0426 700/276 |
| 2012/0239205 | A1 | 9/2012 | Gary | |
| 2015/0088288 | A1 * | 3/2015 | Madonna | G01S 5/02 700/90 |
| 2016/0011660 | A1 * | 1/2016 | Wieder | G06F 3/04815 345/158 |

FOREIGN PATENT DOCUMENTS

| | | |
|---|---|---|
| JP | 2008212736 | 9/2008 |
| JP | 2008212737 | 9/2008 |
| JP | 2009082112 | 3/2009 |
| JP | 2009201746 | 9/2009 |
| JP | 2009201747 | 9/2009 |
| JP | 2009201748 | 9/2009 |
| JP | 2009201750 | 9/2009 |
| JP | 2009201751 | 9/2009 |
| JP | 2009201752 | 9/2009 |
| JP | 2009201753 | 9/2009 |
| JP | 2009201764 | 9/2009 |
| JP | 2009254593 | 11/2009 |
| JP | 2009254594 | 11/2009 |
| MX | 2008004855 | 9/2008 |
| WO | 2009029877 | 3/2009 |

OTHER PUBLICATIONS

United States Patent and Trademark Office, "Final Office action", issued in connection with U.S. Appl. No. 13/421,542, dated Feb. 24, 2015, 38 pages.

* cited by examiner

ENVIRONMENT CONTROLLER, AN ENVIRONMENT CONTROL SYSTEM AND ENVIRONMENT CONTROL METHOD

CROSS-REFERENCE TO RELATED APPLICATIONS

This patent arises from and claims the benefit of priority as a continuation to U.S. Non-Provisional patent application Ser. No. 13/421,542, filed on Mar. 15, 2012, entitled "An Environment Controller, an Environment Control System and Environment Control Method", which claims priority to U.S. Provisional Patent Application No. 61/452,892, filed on Mar. 15, 2011, entitled "An Environment Controller, an Environment Control System and Environment Control Method", each of which is herein incorporated by reference in its entirety.

FIELD

The present invention relates to an environment controller, an environment control system and an environment control method.

BACKGROUND

Gaming venues employ heating, ventilation and air-conditioning (HVAC) systems to control the environment within a gaming venue. Such HVAC systems vary in level of sophistication from manually controlled systems to systems which control the environment based on complex user settings and feedback from sensors disposed around the venue.

Controlling the environment in a gaming venue provides particular challenges, for example, the heat load in a particular part of the venue may vary markedly depending on the number of patrons and/or the number of active gaming machines.

Accordingly, there is a need for an alternative environment control system for gaming venues.

SUMMARY

In a first aspect, the invention provides an environment control system for a venue, the environment control system including:

a controllable device arranged to perform at least one of heating, cooling or ventilation of the venue so as to affect the environment of the venue, a plurality of input devices disposed throughout the venue, each input device operable by a user to input environment feedback;

an environment controller arranged to control the at least one controllable device based on the environment feedback.

In an embodiment, the environment control system includes a plurality of controllable devices each arranged to perform at least one of heating, cooling or ventilation of the venue.

In an embodiment, the environment controller determines which of the plurality of controllable devices to control based on the environment feedback.

In an embodiment, the environment controller is arranged to select which controllable device or devices to control based on location information associated with the environment feedback.

In an embodiment, the environment control system further includes at least one sensor disposed within the venue to provide sensor data to the environment control system, and wherein the environment controller is arranged to control the controllable device based on the sensor data.

In an embodiment, each input device is part of a user interface and the user interface includes a display.

In an embodiment, the environment control system further includes a feedback prompter arranged to cause a message to be displayed on said display requesting the user provide environment feedback.

In an embodiment, the feedback prompter operates in response to at least one condition being met.

In an embodiment, the venue is a gaming venue, and the input devices are disposed at respective ones of a plurality of gaming devices disposed in the gaming venue such that each user input devices is operable by a player at a respective one of the plurality of gaming devices.

In an embodiment, the environment control system is further arranged to receive usage data indicative of use of gaming devices within the venue from a gaming device management system and wherein the environment controller is arranged to control the controllable device based on the usage data.

In an embodiment, the gaming device management system provides the location information to the environment controller.

In a second aspect, the invention provides an environment controller for a venue, the environment controller arranged to receive environment feedback input via a plurality of input devices disposed throughout the venue, each input device operable by a user to input environment feedback, the environment controller arranged to process the environment feedback to generate at least one control output.

In an embodiment, the control output is output to a display to enable an operator to control at least one controllable device arranged to perform at least one of heating, cooling or ventilation of the venue based on the displayed control output.

In an embodiment, the control output is output to at least one controllable device arranged to perform at least one of heating, cooling or ventilation of the venue.

In an embodiment, the environment controller is arranged to determine which of a plurality of controllable devices to control based on the environment feedback.

In an embodiment, the environment controller is arranged to select which controllable device or devices to control based on location information associated with the environment feedback.

In an embodiment, the environment controller is arranged to generate the at least one control output based on sensor data from at least one sensor disposed within the venue.

In an embodiment, the environment controller is arranged to cause a message to be displayed on a display of a user interface requesting the user provide environment feedback.

In an embodiment, the environment controller is arranged to cause the message to be displayed in response to at least one condition being met.

In an embodiment, the environment controller is arranged to receive usage data indicative of use of respective ones of a plurality of gaming devices gaming devices within the venue from a gaming device management system and to generate the at least one control output based on the usage data.

In a third aspect, the invention provides a method of controlling an environment of a gaming venue, the method including:

receiving environment feedback input from via a plurality of input devices disposed in the venue, each input device operable by a user to input environment feedback; and controlling at least one controllable device arranged to perform at least one of heating, cooling or ventilation of the venue so as to affect the environment of the venue based on the environment feedback.

In an embodiment, the method includes determining which of a plurality of controllable devices to control based on the environment feedback.

In an embodiment, the method includes selecting which controllable device or devices to control based on location information associated with the environment feedback.

In an embodiment, the method includes controlling the controllable device based on the sensor data from at least one sensor disposed within the venue.

In an embodiment, the method includes causing a message to be displayed on a display of a user interface requesting the user provide environment feedback.

In an embodiment, the method includes causing the message to be displayed in response to at least one condition being met.

In an embodiment, the method includes receiving usage data indicative of use of respective ones of a plurality of gaming devices gaming devices within the venue from a gaming device management system and controlling the controllable device based on the usage data.

In a fourth aspect of the invention provides computer program code which when executed causes a computer to implement the reservation method.

In a fifth aspect the invention provides a tangible computer readable medium having the program code thereon.

Figure 1:
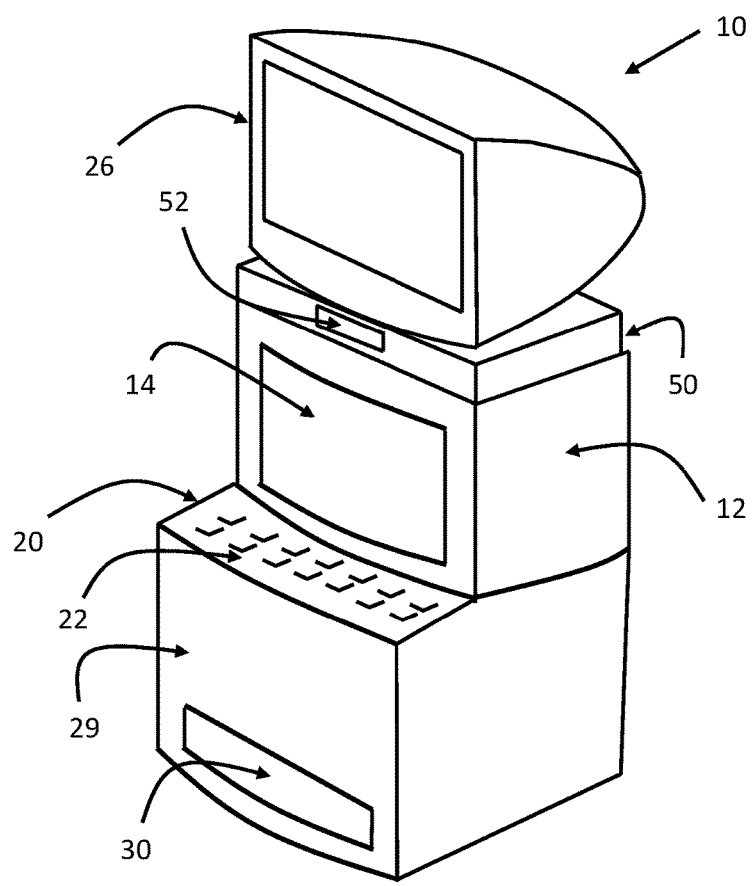
FIG. 1 is a perspective view of a gaming machine of an embodiment.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, Blu-ray, etc., storing the software and/or firmware.

Referring to the drawings, there is shown an environment control system for a venue. In the embodiment, the venue is a gaming venue such as a casino or the like.

Persons skilled in the art will appreciate that some venues have electronic gaming tables playable by a plurality of players. For the purpose of this specification, a player position at such a table should be understood as being within the meaning of "a gaming device". Accordingly, within this specification "gaming device" encompasses, for example, a single player, electronic gaming machine arranged to play one or more resident games, a player position at a gaming table, and an interactive video gaming terminal in a server based gaming system.

A typical stand alone gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism for example a coin input chute and/or a bill collector 24B. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type.

A player marketing module (PMM) 50 having a display 52 is connected to the gaming machine 10. The main purpose of the PMM 50 is to allow the player to interact with a player loyalty system. The PMM has a magnetic card reader for the purpose of reading a player tracking device in the form of a magnetic swipe card, for example as part of a loyalty program. However other reading devices may be employed and the player tracking device may be in the form of a card, flash drive or any other portable storage medium capable of being read by a reading device.

Figure 2:
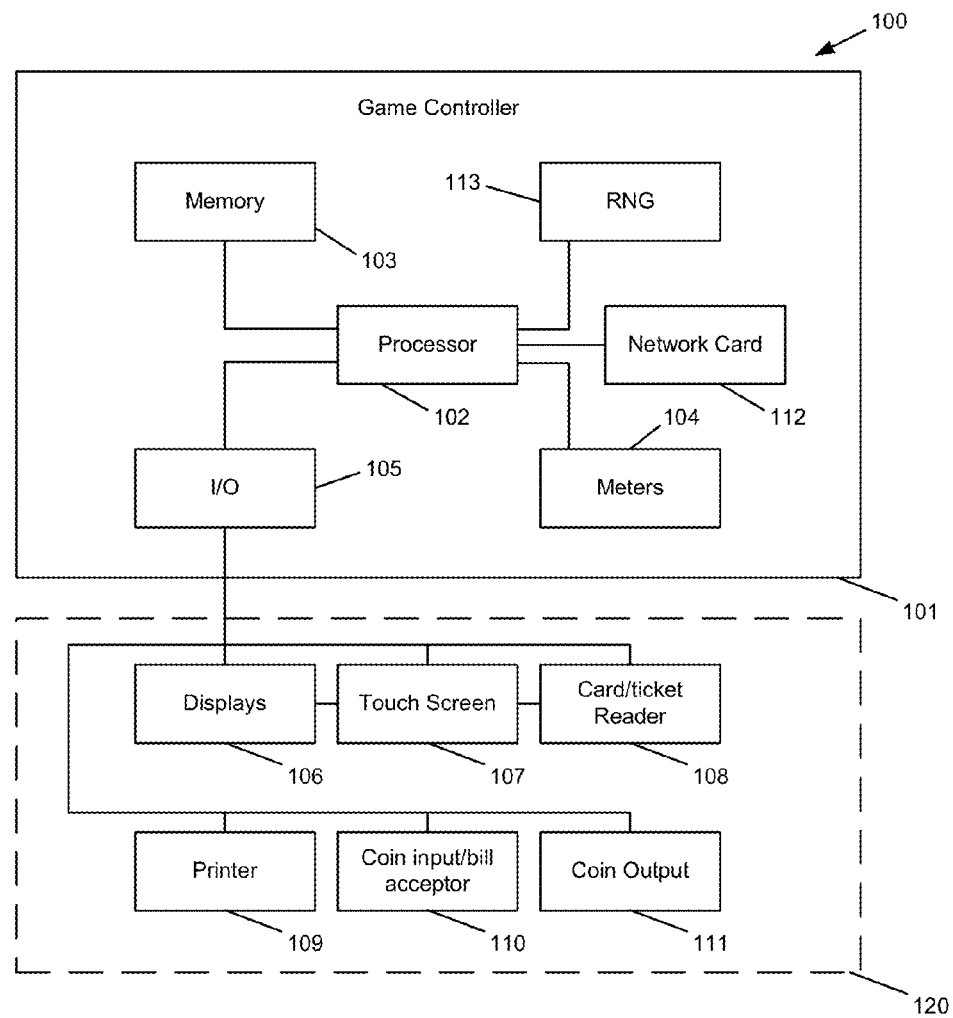
FIG. 2 is a block diagram of the gaming machine of an embodiment.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102.

Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 has one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 3:
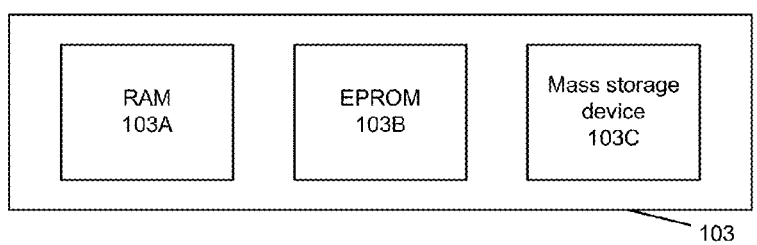
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 4:
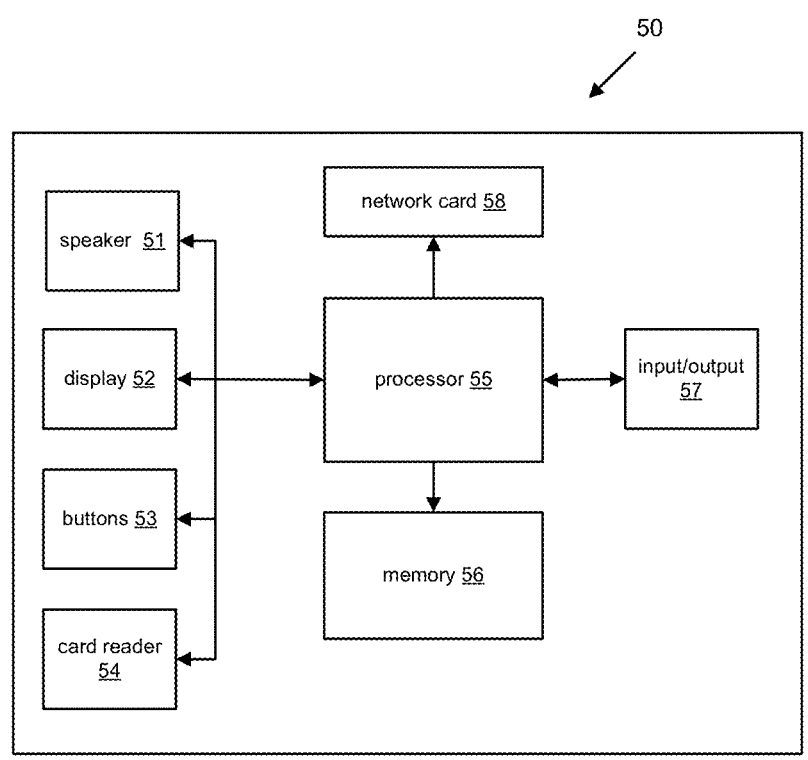
FIG. 4 is a block diagram of a player marketing module of an embodiment.

FIG. 4 is a block diagram of a player marketing module 50. The player marketing module 50 is connected via input/output port 57 to a serial input output port of the input/output section 105 of the electronic gaming machine. The player marketing module has a card reader 54 and a display 52 which may be a touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to the loyalty system by a network card 58. Thus, in the embodiment, the gaming machine 10 communicates with the venue management system via the PMM as described in further detail below. The venue management system may incorporate a player tracking system or the PMM may also communicate with a separate player tracking system. Processor 55 is also arranged to communicate with a gaming machine 10.

Figure 5:
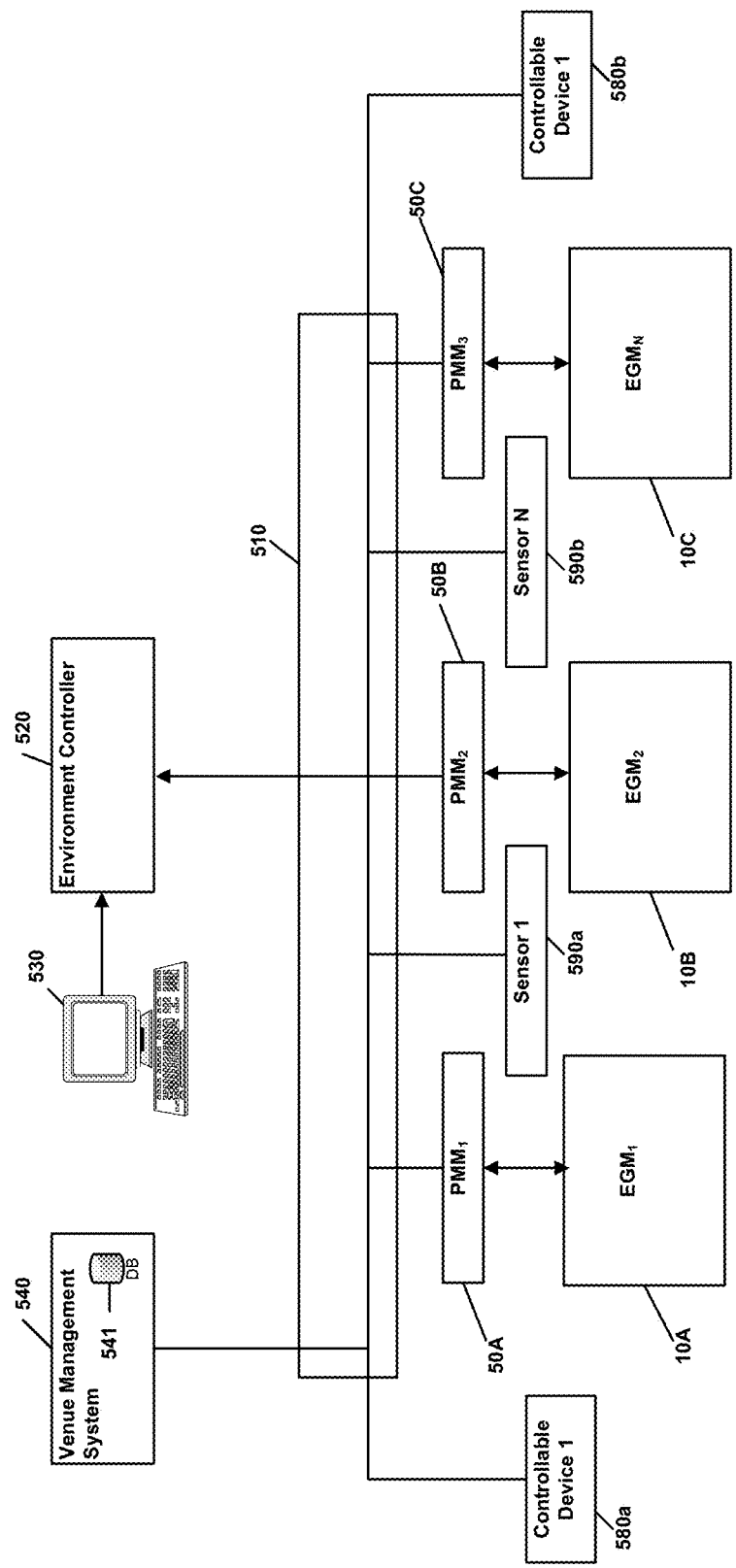
FIG. 5 is a block diagram showing how a plurality of gaming machines are networked and in data communication with an environment controller.

FIG. 5 shows a series of electronic gaming machines 10 connected via respective player marketing modules 50 over a communications network 510 to an environment management controller 520 and a venue management system 540. The communications network 510 may be any suitable communications network for example an Ethernet.

Also shown as connected in the communication network in FIG. 5 are a plurality of controllable devices 580 and a plurality of sensors 590. Persons skilled in the art will appreciate that such sensors and controllable devices may not be connected via a network. For example, in other embodiments, they may be connected directly to the environment controller or to a control panel. Accordingly, it will be appreciated that the particular form of connection shown in FIG. 5 is for illustrative purposes. A user terminal 530 is connected to the environment controller 520 in order to alter settings of the environment controller 520.

Figure 6:
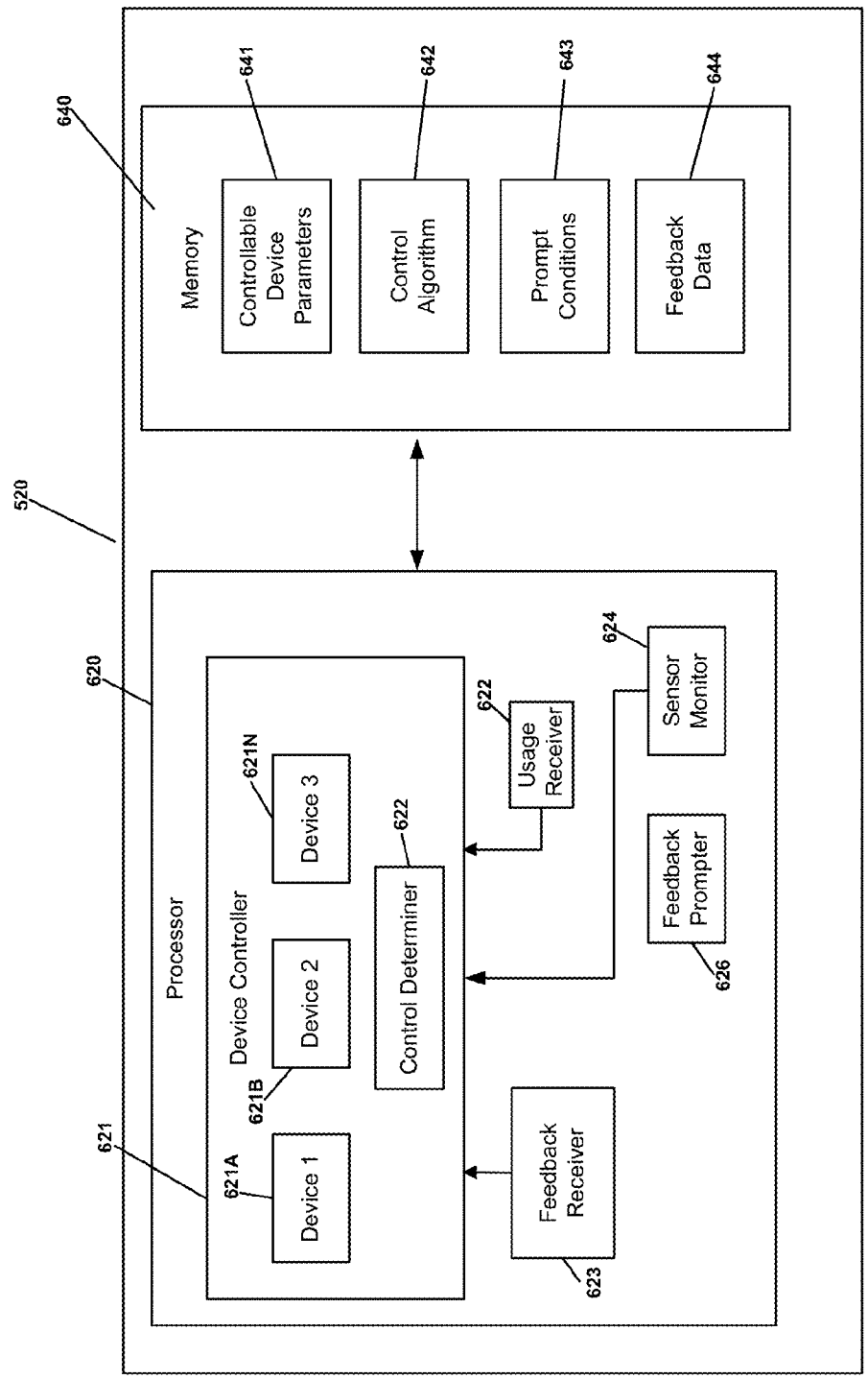
FIG. 6 is a functional block diagram of an environment controller.

FIG. 6 shows one embodiment of an environment controller 520. In the embodiment, the environment controller is implemented by a processor 620 executing program code stored in memory 640. The memory 640 is also used to store the current parameters 641 of the controllable devices. In this respect, the controllable devices can be any suitable heating, ventilation or air-conditioning units. Persons skilled in the art will appreciate that in some embodiments, a single device may provide all of heating, ventilation and air-conditioning. In other embodiments, there may be separate heating and air conditioning plants, connected via a series of ducts to the venue which may be used to provide a combination of heating, cooling, or their circulation. To control these controllable devices 580, the processor 620 implements a device controller 621 with sub-modules 621A, 621B, 621N for each of N devices which are controlled.

The device controller 621 controls the controllable devices based on device parameters 641 stored in the memory. The user terminal 530 is used to set normal device parameters. For example, by setting desired temperatures. Persons skilled in the art will appreciate that there might be other interfaces rather than the user computer, for example a control panel where a user can specify a desired temperature. A person skilled in the art will also appreciate that there may be more sophisticated control parameters, for example allowing parameters to be set for particular times of day etc. The control sub-modules 621A, 621B, 621N, translate these higher level settings into more specific device parameters, such as fan speed or heating level.

The device controller comprises a control determiner 622 which determines whether the control of the devices should be adjusted. For example, whether changes to the control of any device 580 should be made based on sensor monitor 624 which provides any feedback from sensors disposed around the venue. For example, the sensor may report the current temperature at a location within the venue allowing the control determiner 622, compare the current temperature to the parameter stored in the memory and control one of the N controllable devices 621 so that the temperature approaches the desired temperature.

In the embodiment, the environment controller is also arranged to obtain feedback from players within the venue regarding how they perceive the environment.

In one embodiment, players input to the system can be elicited actively through a pushout "survey" to all or a selected number of players. To this end, a feedback prompter 626 sends out a survey based on prompt conditions 643 stored in memory. Depending on the embodiment, such a survey may be scheduled to occur at a regular interval; may be sent out based upon a pre-configured trigger in the associated gaming management system, for example, when a number of players reaches a threshold; may be sent out based on an unusual temperature change being detected; may be sent out based on an outdoor temperature etc. In an embodiment, the survey, is communicated to the PMM 50 and displayed on display 52. The survey would give the player three options such as "I am too hot", "I am fine", or "I am too cold" and the player would be able to either touch the displayed message on a touch screen display or touch an associated button. Persons skilled in the art will appreciate that different messages can be used or level of granularity can be provided, for example five options instead of three. In an alternative embodiment, players may be able to provide input irrespective of whether they have been prompted feedback prompter 626. For example, the player may select a provide temperature feedback option displayed on display 52. The player could then select from similar options to those described above.

In one embodiment, once each player provides information, this feedback is sent to the venue management system 540. The venue management system adds location information based on the gaming machine from which it was received and passes the feedback to the environment controller 520 where it is received by feedback receiver 623. The feedback receiver 623 may store the feedback data in memory 644 for later use. For example, it may be possible to analyse trends in the feedback data in order to make adjustments to the controllable device parameters 641. The device controller 621 processes the feedback to determine whether to make any adjustment to the control parameters of any of one of the controllable devices 621A to 621N. To this end, control determiner 622 applies control algorithm 644 stored in memory 640. The control algorithm can vary in levels sophistication. In one embodiment, the control algorithm is applied on a region by region basis within the venue; the regions corresponding to a set of one or more controllable devices. In one example, the control algorithm applies a numerical value to the conditions of "too hot", "just right" and "too cold". For example, −1 for too hot, 0 for just right and +1 for too cold. The control determiner then determines the average value from machines within the location in the venue and for positive values applies additional cooling and for negative values applies additional heating. The amount of additional heating or cooling which is applied can be determined based on a weighting and the magnitude of the determined values. In one example, this can be achieved by control determiner 622 storing temporary values of the controllable device parameters 641 (e.g. different set temperature points) based on the feedback.

Persons skilled in the art will appreciate that other features may be implemented. For example, the feedback receiver 623 may be arranged to monitor for abnormal trends. For example numerous "too hot" or "too cold" votes from a particular area may indicate that a controllable device of the environment system is not working and may trigger output of an alert for further investigation and/or action. Similarly, numerous votes from a single player may be used to trigger a more personalised investigation/response as appropriate. For example, a venue host could visit the patron to determine whether they require extra clothing.

A person skilled in the art will appreciate that while the embodiment has been described as being implementable in relation to PMMs 50, some operators build an interface for accessing additional services into the main game screen. For example, a particular button may bring up a menu on the main gaming machine display where a player can make selections.

Persons skilled in the art will also appreciate that while a main advantage of the invention can be obtained by directly controlling one or more controllable devices, in other embodiments, the feedback information may be gathered, processed and then output, for example on user terminal 530, to enable a user to control a manually operable control panel. For example, such an output could be "9 out of 10 patrons in region X report being too cold".

Persons skilled in the art will appreciate that other control parameters may be used. For example, FIG. 6 shows that the environment controller includes a usage receiver 622 which receives usage information about gaming machines on the floor. The usage information may indicate how many gaming machines are active as the number of machines being used in a particular region of the venue increases, there will be an additional heat load. Accordingly, the control determiner 622 may take into account the number of active machines.

In other embodiments, feedback from users is received separately by feedback receiver as opposed with and location information is received separately by usage receiver 625. The information is then collated by the environment controller 520.

Persons skilled in the art will also appreciate that while certain functions are shown as being placed within the environment controller 520 they could be placed elsewhere. For example, the processing of feedback data could be performed within the venue management system 540. In another example, the venue management systems 540 may be responsible for prompting for feedback, and gathering and processing that feedback before providing outcomes to the environment controller 520.

Persons skilled in the art will appreciate that the embodiment provides advantages over existing HVAC systems as it enables users to participate in the feedback loop. Player comfort is a key factor for players engaged on a casino floor. While modern HVAC systems employ sophisticated sensors, they cannot completely sense how players "feel". Further, configuring a system involves a certain amount of guess work in that the temperatures which are set in the system are based on what the person responsible for managing the system perceives to be an appropriate. Such estimated temperatures may not always be appropriate. For example, if the manager of the system ascertains whether the temperature is appropriate by walking through the floor of the venue, they may have a very different perception of whether the temperature is appropriate to a player who sits in front of a gaming machine for an extended period of time. An additional advantage of the embodiment is that it gives players a sense of empowerment allowing them to provide feedback on the environmental conditions around them.

Persons skilled in the art will appreciate that such systems can be extended to other environments where it is possible to obtain user feedback from a plurality of locations within a venue. For example, via PCs at users' desks in a workplace.

Figure 7:
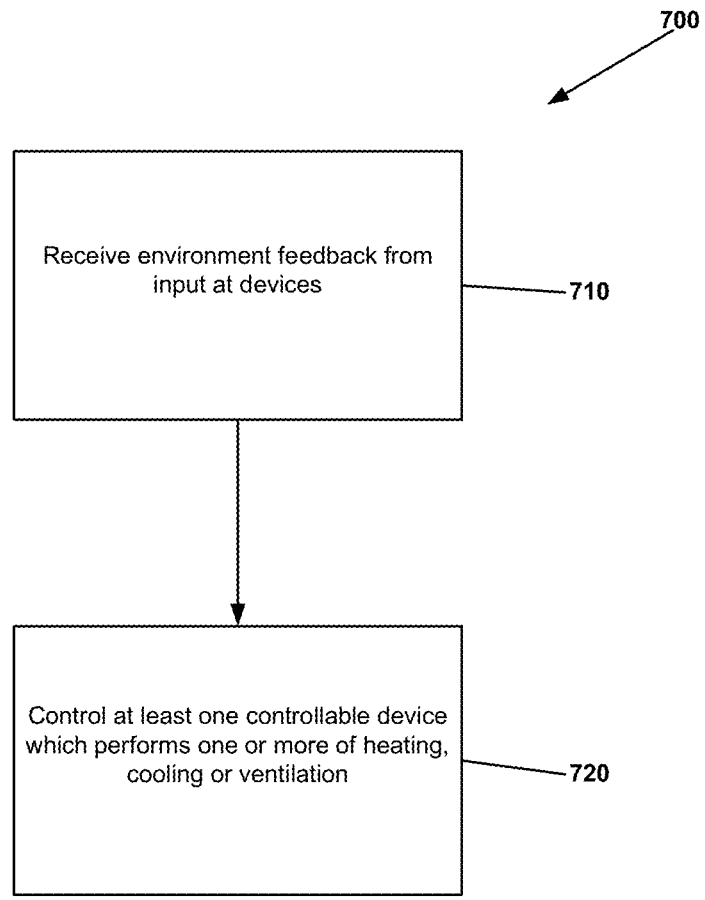
FIG. 7 is a flowchart of a method of an embodiment.

An example method is illustrated in the flowchart of FIG. 7. FIG. 7 depicts an example flow diagram representative of processes that may be implemented using, for example, computer readable instructions that may be used to facilitate environmental control. The example processes of FIG. 7 may be performed using a processor, a controller and/or any other suitable processing device. For example, the example processes of FIG. 7 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 7 may be implemented manually or as any combination(s) of any of the foregoing techniques, for example, any combination of firmware, software, discrete logic and/or hardware. Further, although the example processes of FIG. 7 are described with reference to the flow diagram of FIG. 7, other methods of implementing the processes of FIG. 7 may be employed. For example, the order of execution of the blocks may be changed, and/or some of the blocks described may be changed, eliminated, sub-divided, or combined. Additionally, any or all of the example processes of FIG. 7 may be performed sequentially and/or in parallel by, for example, separate processing threads, processors, devices, discrete logic, circuits, etc.

A method of an embodiment is shown in FIG. 7. The method involves receiving environment feedback from input devices disposed around the venue 710. The method then involves controlling at least one controllable device which performs one or more of heating, cooling or ventilation 720 based on the received feedback.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM, DVD, Blu-ray, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It will be understood to persons skilled in the art of the invention that many modifications may be made without departing from the spirit and scope of the invention, in particular it will be apparent that certain features of embodiments of the invention can be employed to form further embodiments. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An environment control system for a venue, the environment control system comprising:
    a controllable device configured to perform at least one of heating, cooling, and ventilation of the venue;

a plurality of input devices disposed throughout the venue, each input device associated with a gaming device in the venue and operable by a user to input qualitative environment feedback, each input device comprising a display;

a feedback prompter configured to transmit a message for display on at least one display, the message including a plurality of survey options and a request to the user to provide the qualitative environment feedback by selecting one of the plurality of survey options;

a venue management system configured to receive the qualitative environment feedback and add location information to the qualitative environment feedback based on the input device from which the qualitative environment feedback is received; and an environment controller configured to control the at least one controllable device by adjusting a control parameter of the at least one controllable device based on the qualitative environment feedback and location information and control the feedback prompter to transmit the message in response to at least one prompt condition.

2. An environment control system as claimed in claim 1 further comprising a plurality of controllable devices, each controllable device configured to perform at least one of heating, cooling, and ventilation of the venue.

3. An environment control system as claimed in claim 2, wherein the environment controller determines which of the plurality of controllable devices to control based on the environment feedback.

4. An environment control system as claimed in claim 3, wherein the environment controller is configured to select at least one controllable device of the plurality of controllable devices to control based on the location information associated with the environment feedback.

5. An environment control system as claimed in claim 1 further comprising at least one sensor disposed within the venue to provide sensor data to the environment controller, and wherein the environment controller is configured to control the at least one controllable device by adjusting the control parameter based on the sensor data.

6. An environment control system as claimed in claim 1, wherein each input device is part of a user interface, and the user interface comprises the display.

7. An environment control system as claimed in claim 1, wherein the at least one prompt condition includes at least one of a temporal condition, a number of players condition, a temperature condition, and a temperature change condition.

8. An environment control system as claimed in claim 1, wherein the venue is a gaming venue, and wherein the plurality of input devices is disposed at respective ones of a plurality of gaming devices disposed in the gaming venue such that each of the plurality of input devices is operable by a player at a respective one of the plurality of gaming devices.

9. An environment control system as claimed in claim 8, wherein the environment controller is further configured to receive usage data indicative of use of at least one of the plurality of gaming devices within the venue from a gaming device management system, and wherein the environment controller is further configured to control the at least one controllable device by adjusting the control parameter based on the usage data.

10. An environment control system as claimed in claim 9, wherein the environment controller is further configured to select at least one controllable device to control based on location information associated with the environment feedback, and wherein the gaming device management system is configured to provide the location information to the environment controller.

11. An environment control system as claimed in claim 8, wherein the venue management system is further configured to receive the environment feedback from a subset of the plurality of input devices, and wherein the environment controller is further configured to adjust the control parameter of the at least one controllable device according to an average feedback value associated with the environment feedback from the subset of the plurality of input devices.

12. An environment control system as claimed in claim 11, wherein the venue includes a plurality of regions and the location information identifies a region associated with each input device of the plurality of input devices, wherein the environmental control system further comprises a plurality of controllable devices, each controllable device configured to perform at least one of heating, cooling, and ventilation of a respective region to the plurality of regions, and wherein the environment controller is further configured to:

select at least one controllable device of the plurality of controllable devices to control based on the location information associated with the environment feedback from the subset of the plurality of input devices; and adjust the control parameter of each at least one controllable device according to an average feedback value associated with the environment feedback received from at least one input device within each region of the plurality of regions.

13. An environment controller for a venue, the environment controller comprising:

a processor configured to:

control a feedback prompter to transmit a message for display at at least one input device disposed throughout the venue in response to at least one prompt condition, the message including a plurality of survey options and a request to a user to input qualitative environment feedback by selecting one of the plurality of survey options, each input device associated with a gaming device in the venue and operable by the user to input the qualitative environment feedback;

receive qualitative environment feedback input via the at least one input device;

receive location information with respect to the qualitative environment feedback based on the input device from which the qualitative environment feedback is received; and process the qualitative environment feedback to generate at least one control output to control at least one controllable device in the venue by adjusting a control parameter of the at least one controllable device, based on the qualitative environment feedback and location information, to perform at least one of heating, cooling, and ventilation of the venue.

14. An environment controller as claimed in claim 13, wherein the at least one control output is output to a display to enable an operator to control the at least one controllable device configured to perform at least one of heating, cooling, and ventilation of the venue based on the displayed control output.

15. An environment controller as claimed in claim 13, wherein the processor is further configured to determine which of a plurality of controllable devices to control based on the environment feedback.

16. An environment controller claimed in claim 15, wherein the processor is further configured to select at least one controllable device to control based on the location information associated with the environment feedback.

17. An environment controller claimed in claim 13, wherein the processor is further configured to generate the at least one control output by adjusting the control parameter based on sensor data from at least one sensor disposed within the venue.

18. An environment controller as claimed in claim 13, wherein the at least one prompt condition includes at least one of a temporal condition, a number of players condition, a temperature condition, and a temperature change condition.

19. An environment controller as claimed in claim 13, wherein the processor is further configured to:
   receive usage data indicative of use of respective ones of a plurality of gaming devices within the venue from a gaming device management system; and
   generate the at least one control output, the control output including adjusting the control parameter based on the usage data.

20. A method of controlling an environment of a gaming venue, the method comprising:
   detecting at least one prompt condition;
   controlling a feedback prompter to transmit a message for display at at least one input device disposed throughout the gaming venue in response to the at least one prompt condition, the message including a plurality of survey options and a request to a user to input qualitative environment feedback by selecting one of the plurality of survey options, each input device associated with a gaming device in the gaming venue and operable by the user to input the qualitative environment feedback;
   receiving the qualitative environment feedback input from the at least one input device;
   adding location information to the qualitative environment feedback based on the input device from which the qualitative environment feedback is received; and
   controlling at least one controllable device configured to perform at least one of heating, cooling, and ventilation of the venue by adjusting a control parameter of the at least one controllable device based on the qualitative environment feedback and location information.

21. A method as claimed in claim 20 further comprising determining which of a plurality of controllable devices to control based on the environment feedback.

22. A method as claimed in claim 20 further comprising selecting at least one controllable device to control based on the location information associated with the environment feedback.

23. A method as claimed in claim 20 further comprising:
   receiving sensor data from at least one sensor disposed within the gaming venue; and
   controlling the at least one controllable device by adjusting the control parameter based on the sensor data.

24. A method as claimed in claim 20 further comprising:
   receiving usage data indicative of use of respective ones of a plurality of gaming devices within the venue from a gaming device management system; and
   controlling the at least one controllable device by adjusting the control parameter based on the usage data.

25. A method as claimed in claim 20, wherein detecting at least one prompt condition comprises detecting at least one of a temporal condition, a number of players condition, a temperature condition, and a temperature change condition.

26. A tangible, non-transitory computer readable medium comprising computer program code that, when executed by at least one processor, configures the at least one processor to implement a method of controlling an environment of a gaming venue, the method comprising:
   detecting at least one prompt condition;
   controlling a feedback prompter to transmit a message for display at at least one input device disposed throughout the gaming venue in response to the at least one prompt condition, the message including a plurality of survey options and a request to a user to input qualitative environment feedback by selecting one of the plurality of survey options, each input device associated with a gaming device in the gaming venue and operable by the user to input the qualitative environment feedback;
   receiving the qualitative environment feedback input from the at least one input device;
   adding location information to the qualitative environment feedback based on the input device from which the environment feedback is received; and
   controlling at least one controllable device configured to perform at least one of heating, cooling, and ventilation of the venue by adjusting a control parameter of the at least one controllable device based on the qualitative environment feedback and location information.

* * * * *